United States Patent [19]

Zimmerman

[11] 4,170,832

[45] Oct. 16, 1979

[54] INTERACTIVE TEACHING MACHINE

[76] Inventor: Kurt E. Zimmerman, 13265 Edinburgh Dr., Westminster, Calif. 92683

[21] Appl. No.: 695,491

[22] Filed: Jun. 14, 1976

[51] Int. Cl.² ............................................. G09B 7/08
[52] U.S. Cl. ..................................................... 35/9 A
[58] Field of Search ................ 35/9 A, 11 R, 17, 8 R, 35/8 A

[56] References Cited

U.S. PATENT DOCUMENTS

| | | | |
|---|---|---|---|
| 3,395,464 | 8/1968 | Leslie et al. | 35/9 A |
| 3,408,749 | 11/1968 | Brudner | 35/11 R UX |
| 3,483,633 | 12/1969 | Geils et al. | 35/9 A |
| 3,611,587 | 10/1971 | Roberts | 35/8 A |
| 3,623,157 | 11/1971 | Stapleford | 35/9 A X |
| 3,774,316 | 11/1973 | Meier | 35/9 B |
| 3,810,316 | 5/1974 | Lahlou | 35/8 A |
| 3,818,609 | 6/1974 | Woolman | 35/8 R |
| 3,987,484 | 10/1976 | Bosche et al. | 35/9 A X |

Primary Examiner—William H. Grieb
Attorney, Agent, or Firm—Knobbe, Martens, Olson, Hubbard & Bear

[57] ABSTRACT

An audiovisual teaching machine utilizes video recorded instruction material and a student console including a television or motion picture monitor. A switch on the monitor allows the student to begin an instruction segment in which motion video information is produced on the video monitor depicting a sequence of events leading to a choice of alternative actions and followed by an indication of the possible alternatives. The apparatus automatically stops the video presentation after the display of alternatives and displays the likely consequences of any one of the alternatives selected by manipulation of front panel switches by the student. The likely outcome of the student's selection is depicted in motion video form to allow the student to experience the consequence of his decision.

16 Claims, 4 Drawing Figures

INTERACTIVE TEACHING MACHINE

BACKGROUND OF THE INVENTION

This invention relates to audiovisual teaching apparatus and, more particularly, to apparatus for presenting motion video sequences for educational purposes.

Audiovisual teaching apparatus in the prior art has generally fallen into two distinct categories. The first category includes simple motion picture or video tape programs offering instruction for the benefit of students and permitting students to experience, through the medium of video projection, a wide variety of subject matter. The second general class of prior art audiovisual teaching equipment utilizes still projection or motion video projection of events leading to a question which must be answered by the student. Such equipment may, for example, be computer controlled such that, when the student has made his choice, the equipment notifies the student as to whether his choice was correct or incorrect and often arranges the teaching set to conform with the student's learning progress.

Both of these forms of audiovisual equipment have serious limitations. The simple video projection, although it may be engrossing to the student, permits no interaction whatsoever, so that it is impossible to determine a student's retention utilizing the equipment or to have the student interact with the equipment. Since interaction requires a greater involvement of the student in the learning process, simple video projection is only partially successful for educational purposes.

The second form of audiovisual teaching equipment permits a certain degree of interaction. The limitation in this case, however, is the fact that, when a student makes an incorrect choice, the equipment notifies him that this choice is incorrect and either repeats the previous question or permits him to proceed to new questions. This type of interaction is similar to the effect on a child of telling the child, for example, that it is unsafe to enter a busy street. The child may accept this statement, but the mere statement can never have the effect that seeing an accident occur in the busy street can have. Thus, although there is a certain degree of feedback in such equipment, the feedback is a simple positive or negative and does not reinforce the student's learning through experience.

SUMMARY OF THE INVENTION

The present invention alleviates the difficulties in the prior art apparatus for audiovisual teaching by utilizing the engrossing medium of motion video presentation to not only present alternative choices to the student but also to show the student, in motion video form, the likely consequences of his choice. The equipment includes a multitrack video medium such as multiple track video magnetic tape or multiple track motion picture film wherein the projected track is selected by movement of a playback head or projection optics. Coding information is also recorded on the video medium to automatically operate the playback monitor equipment.

The invention includes a console having a video monitor and a plurality of switches for operation by the student. The student utilizes a switch to begin the projection sequence, and a motion video event series is projected on the monitor for viewing by the student. The motion video sequence leads to a presentation of alternative choices of action to the student, at which time the projection automatically stops. By manipulating one of several switches on the student's console, the student can select one of the presented optional actions to be taken. The video monitor and recording medium automatically proceeds, through a movement of the recording head or projection optics, to the correct medium track to display on the monitor in motion video form the likely consequences of the student's choice. When the likely consequence sequence has terminated, the student can repeat the sequence, selecting a different choice of action, or can again push the start button to proceed to the next sequence of events.

It may be helpful to a complete understanding of the invention to cite an example. If the equipment of this invention were utilized in training medical students, the initial motion video sequence could depict an emergency room in a hospital with an entering patient. During this initial sequence, certain diagnostic tests are administered on the patient and the student is apprised, through this video sequence, of the outcome of the diagnostic tests. At the completion of the initial sequence, plural numbered or lettered choices of action, such as the administration of plural different medications, can be projected on the video monitor for the student. The video projection then stops and the student depresses a selection switch to signify the medication which he deems appropriate for treating the patient. As soon as he has made his selection, the video equipment automatically switches to a track containing the likely consequences of this selection. If, for example, the medication which the student doctor selected is seriously incorrect, the sequence could depict the patient convulsing and dying. If, on the other hand, the medication has no effect on the patient's condition, the scene which would be depicted would show neither improvement nor degradation in the patient's condition. If the student selected a medication which assisted the patient, the selected scene would show such improvement.

The invention has applications in almost every field of learning, it having been found that the motion video medium is engrossing to the student, holds his awareness longer than almost any other form of instruction, and can reinforce the student's learning by allowing him to experience, through motion video sequences, the consequences of his choices.

The advantageous construction and use of this invention are best understood through the following detailed description which references the drawings, in which.

DETAILED DESCRIPTION OF THE PREFERRED EMBODIMENT

Figure 1:
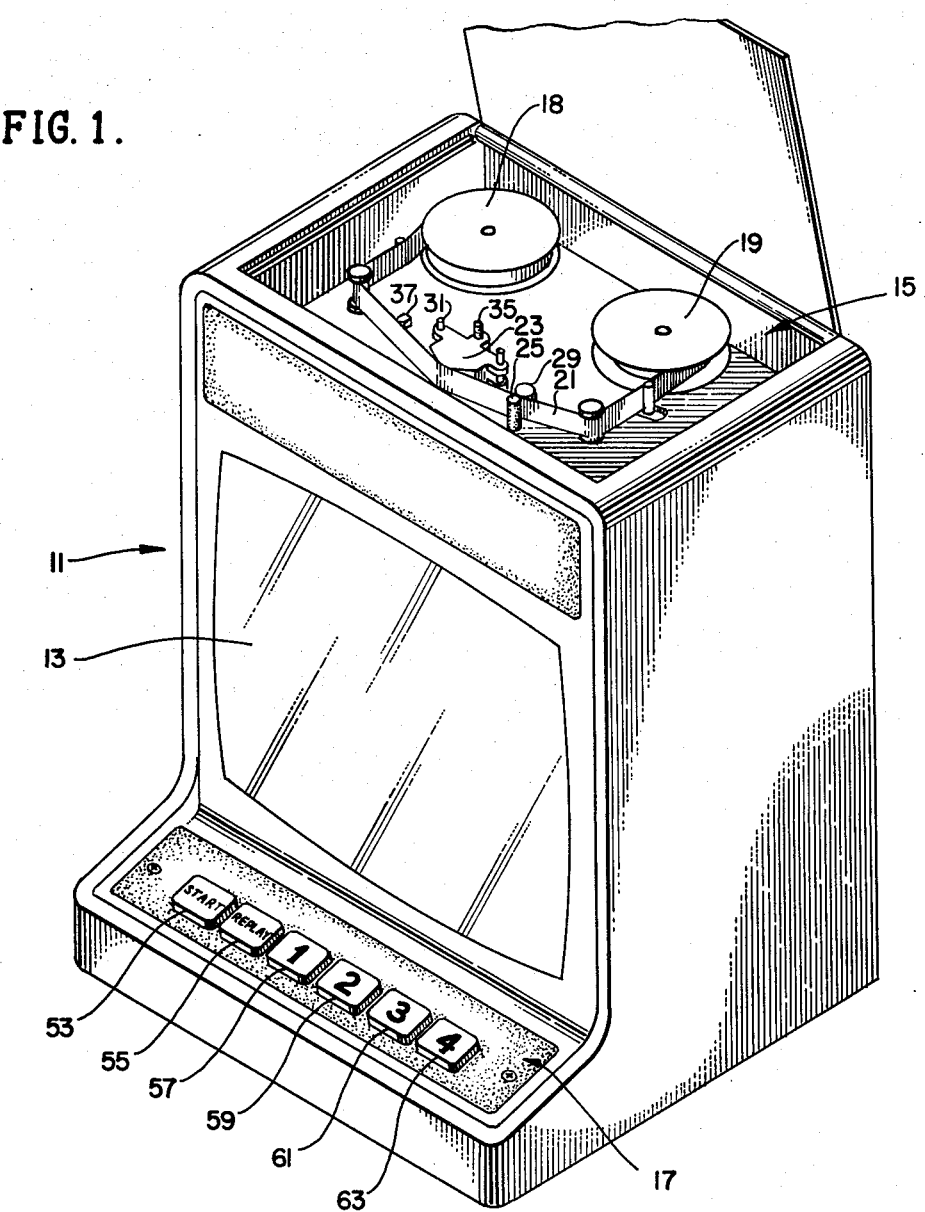
FIG. 1 is a perspective view of the audiovisual teaching apparatus of the present invention.

Referring initially to FIG. 1, the audiovisual teaching apparatus 11 of the present invention is shown to include a common television monitor 13, a video tape transport 15 mounted thereon, and a switch console 17 having plural labeled switches. The first of these switches, labeled "start", is utilized by the student for initiating the motion video sequence. The second switch on the console 15 is labeled "replay" and permits the student to repeat a motion video sequence after its completion. The next four switches, labeled "1" through "4", are utilized by the student for selecting a course of action in response to the scene depicted on the video monitor 13.

Figure 2:
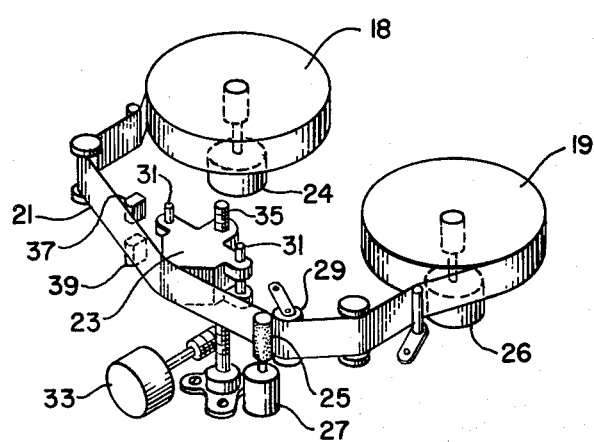
FIG. 2 is a perspective schematic view of the video tape transport used for projection of motion video images in the apparatus of FIG. 1.

Located on the top of the monitor 13, the video tape transport 15 is shown schematically in FIG. 2 to include a supply reel 18 and a take-up reel 19 for transporting a magnetic tape 21 past a playback head 23. Each of the supply and take-up reels 18, 19 is rotated on the armature shaft of a motor 24 and 26, respectively, the motor 24 being energized to rewind the tape 21 and being unenergized during the normal playback mode of the transport 15. The motor 26 is a low torque motor which serves only to generate tension in the tape 21 for collecting the tape 21 on the reel 19 and for providing adequate contact with a capstan 25. The capstan 25 is driven by a synchronous motor 27 at a closely regulated speed. The contact of the capstan 25 with the tape 21 may be assured by a pressure roller 29 bearing against the tape 21 opposite the capstan 25.

A pair of guides 31 mount the playback head 23 for vertical movement, as viewed in FIG. 2, to select various recorded tracks on the tape 21. A motor 33 drives a lead screw 35 threaded to the mounting for the playback head 23 to adjust the position of the playback head 23 along the guides 31.

In addition, a pair of switches 37 and 39 are positioned along the path of the tape 21, the switch 37 being responsive to metal foil tape positioned at the top of the tape 21 and the switch 39 being responsive to metal foil tape at the lower edge of the tape 21, as viewed in FIG. 2. As is common in the audio 8-track tape systems currently on the market, the switches 37 and 39 are responsive to the presence of foil on the tape 21 for closure, each of the switches 37, 39 responding only to metal foil passed adjacent the switch structure.

Figure 3:
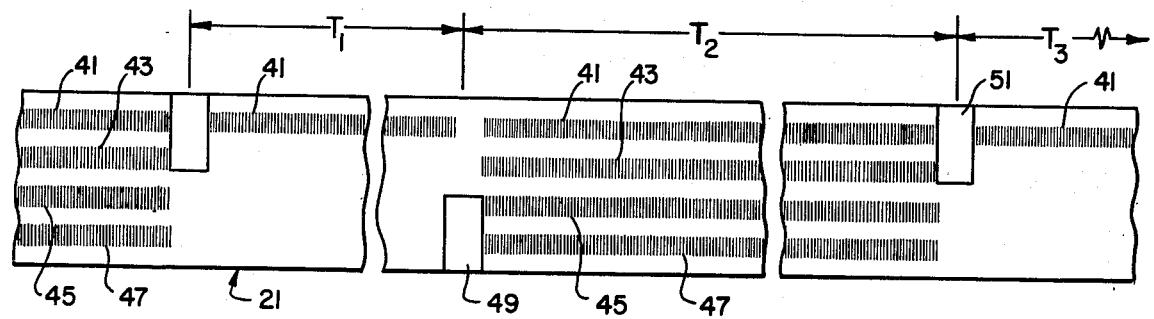
FIG. 3 is a schematic illustration of a segment of the audiovisual medium used in the transport of FIG. 2 of the present invention.

Referring now to FIG. 3, the arrangement of recorded information on the tape 21 will be described. In this exemplary embodiment, the tape 21 has four tracks of recorded motion video information, numbered 41 through 47. At various locations along the tape 21, only the main track, track 41, includes recorded information. For example, during the segment $T_1$ shown in FIG. 3, tracks 43 through 47 are blank. During this period $T_1$, the sequence of motion video events leading up to a requirement for a decision to be made by the student is recorded on track 41. Also in this period $T_1$, after this series of events, the various alternative choices open to the student are presented, along with a designation from 1 through 4 for each of the choices, to enable the student to make a choice on the switches of the console 15. The segment $T_1$ is terminated with a metal foil strip 49 on the lower half of the tape 21, as viewed in FIG. 3. This foil strip 49, as will be understood from the detailed description of the circuitry below, automatically stops the tape transport at this point until a decision is made as to which of the various branch tracks is to be played during the next time period.

This next time period $T_2$ contains recorded information on each of the tracks 41 through 47, each recorded track presenting the likely outcome of different choices in response to the questions presented at the end of time $T_1$. The recorded information in time block $T_2$ terminates with a foil strip 51 at the upper half of the tape 21, signaling the end of this branch sequence. In time $T_3$, which occurs after the foil strip 51, only the track 41 is recorded. This time period $T_3$ presents a new series of events leading to a new decision to be made by the student. From the previous description, it would be appreciated that switch 37 of FIG. 2 responds only to the foil strip 51 while switch 39 responds only to the foil strip 49.

Figure 4:
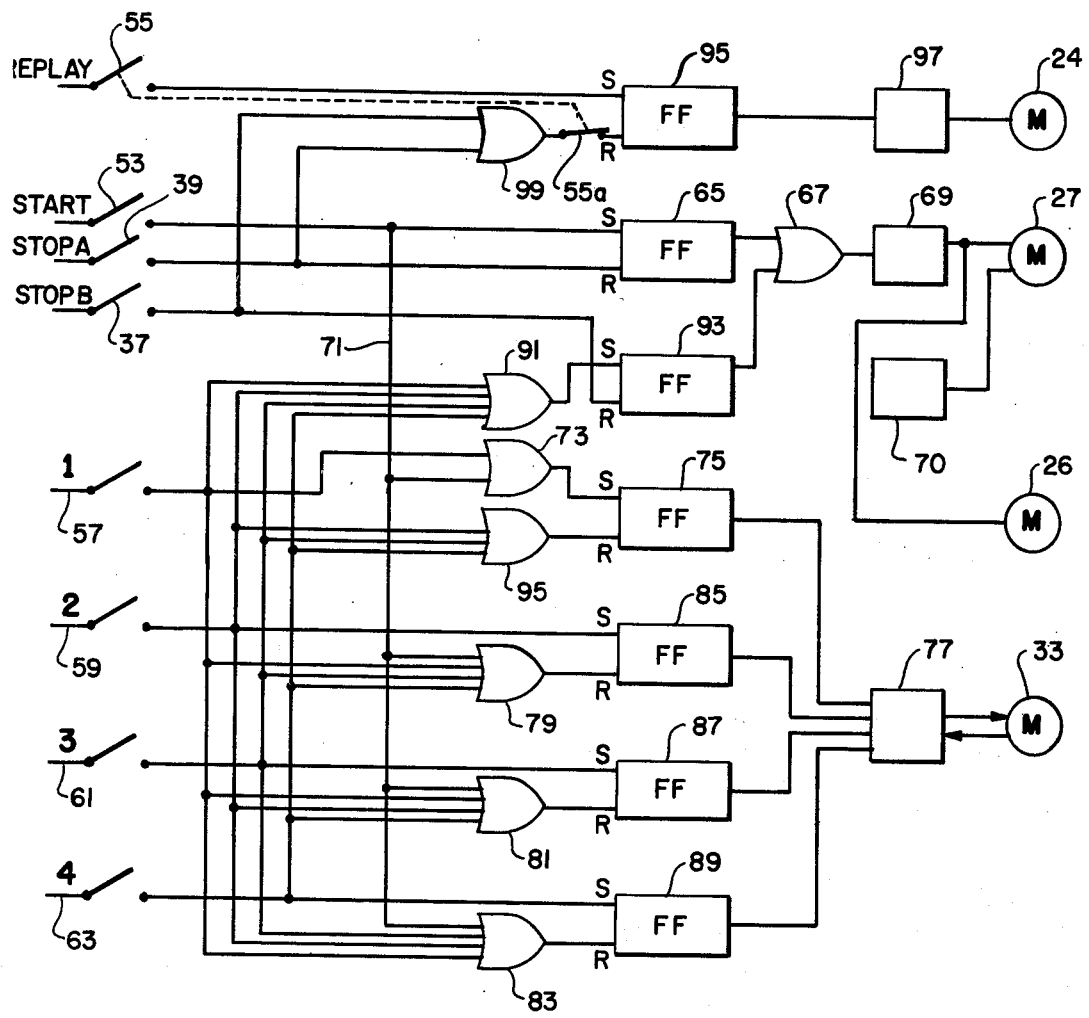
FIG. 4 is a schematic diagram of the electronic logic circuit used in conjunction with the console of FIG. 1 to operate the transport of FIG. 2.

Referring now to FIG. 4, the details of the logic circuitry contained, typically beneath the switch console 15, and responsive to the switches thereon for operating the transport 15 of FIG. 1 will be described. The switches include a start switch 53, a replay switch 55 and four decision selection or track selection switches 57 through 63, numbered 1 through 4, respectively. With tape loaded into the transport 15, the first segment is a track such as that labeled $T_1$ in FIG. 3 and including information recorded on track 41 alone. The educational sequence is started by the student depressing the start switch 53. This switch may be, for example, a momentary push button switch which is connected between a positive voltage and the set input of a monostable multivibrator or flip-flop 65. Depression of switch 53 sets the flip-flop 65 to produce an output, through an OR gate 67, to energize a capstan motor control circuit 69 which may, in this case, be a simple gate or relay energized by the output of the OR gate 67, to supply power to the capstan drive motor 27 as well as video playback electronics 70. Depression of the switch 53 thus begins motion of the capstan 25 of FIG. 2 to advance the tape 21 past the playback head 23. At the same time, depression of the switch 53 places a momentary positive pulse on a line 71 connected to an OR gate 73, the output of which is in turn connected to the set input of a flip-flop 75. This flip-flop 75 is connected to a head selection motor control circuit 77 to drive the head motor 33 to track 41 on the tape 21 (FIG. 3). The signal on this same line 71 is connected to three OR gates 79, 81 and 83, the output of these OR gates being connected to the reset input of three flip-flops 85, 87 and 89, respectively. When these flip-flops 85 through 89 are reset, their outputs, each of which is connected to the head selector logic 77, are grounded, or at binary 0, so that only the output of flip-flop 75 is energized, or at binary 1, controlling the head selector electronics 77 to move the head motor 33 to drive the playback head 23 to a position adjacent track 41. Thus, after the start button 53 has been pushed, the head motor 33 automatically drives the playback head 23 to respond to track 41 on the tape 21, and the recorded sequence is played on the video monitor 13 of FIG. 1. During this time $T_1$, a lifelike sequence of events is portrayed to the student. After this sequence has run its course, the series of four options are presented to the student, each option typically being presented also in motion video form. Thus, in the example previously cited relating to an emergency room situation for training doctors, the administration of four different medications is possible. In that example, the choices may be presented by the doctor in the emergency room asking the attending nurse for medications by name, and a narrator's voice, for example, may be used to identify the four choices by number. At the end of this sequence, metal foil 49 (FIG. 3) will reach the switch 39 of FIG. 2. This switch, as shown in FIG. 4, resets the flip-flop 65, deenergizing the motor control circuit 69 to the capstan drive motor 27 and the video screen goes blank. If, at this point, the student were to again push the start button 53, the foil 49 remains adjacent the switch 39, so that the flip-flop 65 cannot be set, there being a positive voltage on the reset input of this flip-flop 65. The student must therefore push one of the switches numbered 1 through 4, switches 57 through 63 of FIG. 4.

If, for example, the student pushes switch 63, a positive voltage will be supplied to the set input of flip-flop 89. This voltage on the flip-flop 89 will set the flip-flop 89 and place a positive voltage at the input to the head selection electronics 77 connected to the flip-flop 89, adjusting the position of the head motor 33 so that the playback head 23 moves to a location adjacent recorded track 47 of tape 21 (FIG. 3). At the same time, this positive voltage from the switch 63, through an OR gate 91, sets a flip-flop 93, producing a positive input at the OR gate 67 to energize the capstan drive motor 27 as well as the video playback electronics 70 to play the fourth track, track 47, one possible alternative course of events determined to be the likely consequence of the student's choice. The student will therefore view, in motion video form, the likely consequences of his selection. Depression of the switch 63, in addition to setting the flip-flop 89, resets through one of OR gates 79, 81 or 95, each of the flip-flops 75, 85 and 87, so that the only input to the head selector electronics 77 is from the flip-flop 89.

It can be seen from the interconnections of FIG. 4 that depression of any one of the switches 57 through 63 by the student will set one of the flip-flops 75, 85, 87 or 89 in accordance with the switch depressed, and will reset each of the remaining flip-flops 75, 85, 87, 89 so that only one input is at a positive level into the head selector 77. Furthermore, depression of any of the switches will set the flip-flop 93 through the OR gate 91 to energize the capstan drive motor 27 and video playback electronics 70.

At the end of the selected video sequence, the metal foil 51 shown in FIG. 3 will be adjacent the switch 37 of FIG. 2. This switch, as shown in FIG. 4, resets the flip-flop 93, stopping the capstan drive motor 27 and deenergizing the video playback electronics 70. A depression of switches 1 through 4 at this point will be ineffective to begin the video transport, since the flip-flop 93 remains reset by closure of the switch 39.

At this point, the student has a choice of depressing the start switch 53 to begin the next educational sequence, that included in time T₃ of FIG. 3, or to depress the repeat switch 55. Depression of this switch 55 will set a flip-flop 95 to energize the rewind motor 24 through motor drive electronics 97. These electronics 97 may be, for example, a simple switch energized by a positive output of the flip-flop 95. The switch 55 is advantageously coupled mechanically with a normally closed contact pair 55a to interrupt the signal to the reset input of flip-flop 95 from switch 37 or 39 to permit setting of the flip-flop 95. The rewind motor 24 will reverse the direction of the tape transport, as shown in FIG. 2, until either one of the foil strips 49 or 51 closes one of the switches 37, 39, each of these switches being connected to the input of an OR gate 99 which resets the flip-flop 95, deenergizing the rewind motor 24. The student has thus reversed the tape to the decision point and can select another one of the switches 1 through 4 to view a second likely consequence of a decision made in response to the video sequence. Alternatively, the student may again depress the "relay" button 55 to again view the entire video sequence leading up to the original decisional point.

From the description above, it can be seen that the system described herein permits an interaction of the student with the video equipment, the student viewing a motion video scene and making decisions as to how this scene is to proceed. The instructors who produce the film include various choices and the likely consequences of these choices portrayed in motion video form. The student has the choice of viewing the results of various choices or proceeding through the entire sequence on the tape.

As mentioned previously, it will be understood that the electronics of FIG. 4 will operate equally well if the transport of FIG. 2 carries photographic film rather than magnetic tape. In this instance, the tracks 41 through 47 of FIG. 3 will be motion picture film tracks positioned side-by-side on photographic film. The playback head 23 of FIG. 2 may then take the form of projection optics which are moved from film track to film track to project the selected branch of video information.

What is claimed is:
1. An audiovisual teaching apparatus comprising:
   motion video projection means;
   a stored motion video program, said program including:
   a first motion video life-like scene program segment including an introductory scene leading to a decision;
   a second program segment identifying alternative choices of action based on said first program segment;
   means identifying the end of said second program segment;
   multiple third motion video life-like scene program segments each including scenes depicting the likely result of one of said alternative choices of action; and
   means identifying the end of said third program segments;
   apparatus for inputting said stored motion video program into said motion video projection means;
   a switch for initiating operation of said inputting apparatus;
   means automatically interrupting said inputting means in response to said means identifying the end of said second segment;
   switch means for selecting one of said multiple third program segments; and
   means responsive to said switch means for sequencing said inputting means to a selected one of said multiple third program segments.

2. An audiovisual teaching apparatus as defined in claim 1 additionally comprising:
   means automatically interrupting said inputting means in response to said means identifying the end of said third program segments.

3. An audiovisual teaching apparatus as defined in claim 2 additionally comprising:
   switch means for selectively replaying any one of said program segments; and
   means responsive to said switch means for replaying, said means automatically sequencing said inputting means to the beginning of the previous program segment for replay.

4. An audiovisual teaching apparatus as defined in claim 2 additionally comprising:
   means for sensing the end of said selected one of said multiple third program segments; and means responsive to said sensing means for initiating a new program segment including an introductory scene leading to a decision.

5. An audiovisual teaching apparatus as defined in claim 1 wherein said motion video projection means comprises a television monitor and wherein said inputting apparatus comprises a video tape deck attached to said television monitor.

6. An audiovisual teaching apparatus as defined in claim 5 wherein said stored video program comprises a multiple track video tape, said sequencing means adjusting said inputting means for response to different ones of said multiple tracks.

7. Audiovisual teaching apparatus, comprising:
means for projecting a motion video life-like scene depicting a series of events leading to a choice of action and multiple choices of action;
means automatically terminating operation of said projecting means at the end of said multiple choices of action;
means for manually selecting one of said multiple choices of action; and
means responsive to said selecting means for automatically projecting a motion video life-like scene showing the likely results of said one of said multiple choices of action.

8. Audiovisual teaching apparatus as defined in claim 7 wherein said projecting means comprises a video magnetic tape deck electrically interconnected with a television monitor.

9. Audiovisual teaching apparatus as defined in claim 8 wherein said video magnetic tape deck includes multiple track video tape, said means responsive to said selecting means for automatically projecting comprising means for responding to selected tracks of said multiple track video magnetic tape.

10. Audiovisual teaching apparatus as defined in claim 7 wherein said selecting means comprises plural, labeled, manually actuatable switches.

11. A method of operating audiovisual teaching equipment including a stored motion video program having an introductory life-like scene segment leading to identified choices and plural motion video life-like scene segments showing the likely result of such choices, comprising:

projecting said introductory life-like segment and identified choices;
terminating projecting of said motion video program automatically in response to the end of said introductory segment and identified choices;
selecting one of said identified choices by manual actuation; and
automatically projecting in response to said selecting step only one of said plural motion video life-like segments displaying the likely result of said selecting step.

12. A method of operating audiovisual teaching equipment as defined in claim 11 additionally comprising the steps of:
projecting a new introductory life-like segment after said automatic projection of said one of said plural motion video segments; and
selecting a choice based upon said new introductory segment.

13. A method of operating audiovisual teaching equipment as defined in claim 11 comprising the additional step of:
replaying selected segments of said motion video program in response to manipulation of a manual switch.

14. A method of operating audiovisual teaching equipment as defined in claim 11 wherein said stored motion video program is stored on video magnetic tape, said projecting step comprising advancing said video magnetic tape past a playback head.

15. A method of operating audiovisual teaching equipment as defined in claim 14 wherein said video magnetic tape includes indicia indicating the end of program segments, said method additionally comprising:
stopping the advancement of said tape in response to said physical indicia.

16. A method of operating audiovisual teaching equipment as defined in claim 15 wherein said video magnetic tape has multiple recording tracks, said selecting step comprising:
adjusting one of the multiple tracks on said video magnetic tape for cooperation with said playback head.

* * * * *